United States Patent [19]

Markussen et al.

[11] 4,106,991

[45] Aug. 15, 1978

[54] ENZYME GRANULATE COMPOSITION AND PROCESS FOR FORMING ENZYME GRANULATES

[75] Inventors: Erik Kjaer Markussen, Vaerloese; Arne Wintherhalter Schmidt, Skovlunde, both of Denmark

[73] Assignee: Novo Industri A/S, Bagsvaerd, Denmark

[21] Appl. No.: 810,884

[22] Filed: Jun. 28, 1977

[30] Foreign Application Priority Data

Jul. 7, 1976 [GB] United Kingdom ............... 28343/76

[51] Int. Cl.[2] ............................................... C07G 7/02

[52] U.S. Cl. ........................................ 195/63; 195/68

[58] Field of Search ................... 195/63, 68, DIG. 11; 252/DIG. 12

[56] References Cited

U.S. PATENT DOCUMENTS

| | | | |
|---|---|---|---|
| 3,723,327 | 3/1973 | Van Kampen et al. | 196/63 X |
| 3,775,331 | 11/1973 | Borrello | 195/68 X |
| 4,016,041 | 4/1977 | Van Kampen | 195/68 |

*Primary Examiner*—Lionel M. Shapiro
*Attorney, Agent, or Firm*—Fidelman, Wolffe, and Waldron

[57] ABSTRACT

Improved formation of enzyme granulates through inclusion within the composition of finely divided cellulose fibres.

Optionally a waxy substance can be employed for the granulating agent, or to coat the granulate.

11 Claims, 1 Drawing Figure

ENZYME GRANULATE COMPOSITION AND PROCESS FOR FORMING ENZYME GRANULATES

Figure 1:
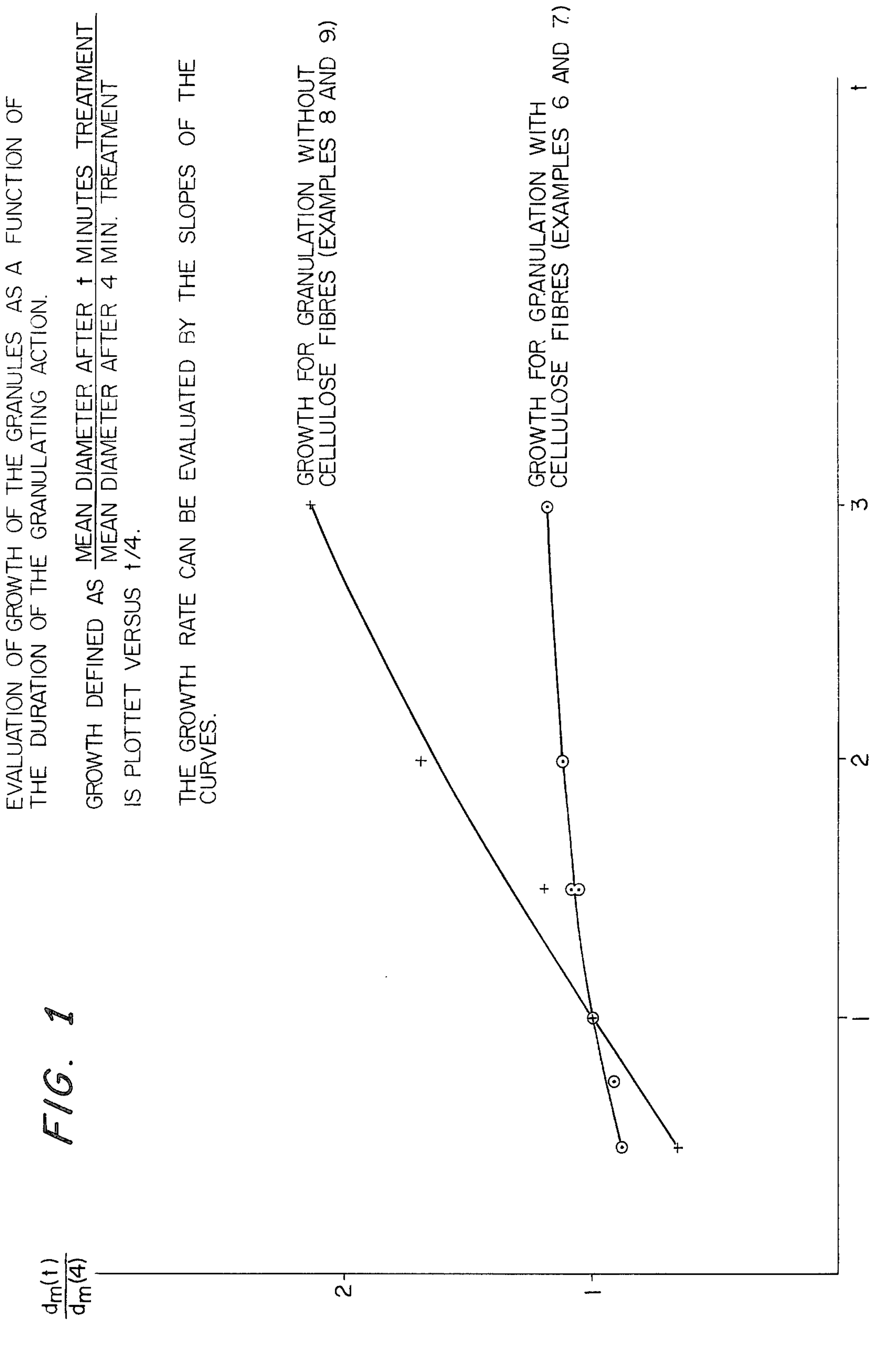

This invention relates to improvement in or relating to a process for the production of an enzyme granulate and the enzyme granulate thus produced.

During the last decade the use of enzymes, especially of microbial origin, has been more and more common. Enzymes are used in for example the starch industry to produce glucose and fructose by means of amylases, amyloglucosidases and glucose isomerases. In the diary industry a vast tonnage of rennets is used and in the detergent industry proteases are normally used as additives in the washing powders to impart a better action on proteinaceous stains on the laundry.

In particular the use of proteolytic enzymes in the detergent industry created a lot of problems in the late sixties in the detergent factories where the workers were exposed to the proteolytic enzymes which at that time normally were available as a fine dusty powder. Workers suffered from attacks from the proteolytic enzymes, especially at the skin around the eyes and in the nose, and some supersensitivity and allergic reactions among the workers were found. These problems increased to the extent that addition of enzymes to detergents was abandoned in many factories early in the seventies.

After the development of the granulated and coated enzymes presently offered to the detergent industry this specific dust problem seems to have disappeared, and use of the enzymes in detergents is again growing steadily.

However, granulation of enzymes is a difficult task. In spite of the fact that patent applications on different methods for the production of granulated and dust-free enzymes have been numerous, hardly more than two or three different granulation methods are in use today on an industrial scale. The most common among those methods are: Embedding of the enzymes into spheres of a waxy material by means of the so-called prilling process, vide German DOS No. 2,060,095, and the process described in British Patent Specification No. 1,362,365, where the enzyme is mixed with a filler, a binder and water, whereafter it is extruded and spheronized in a so-called "Marumerizer" (Trade Mark). By these two methods enzyme granules with very low dust level can be produced.

Nevertheless, both of these methods have some drawbacks. In the prilling process at least about 50% of the product must be a waxy material, for example an ethoxylated fatty alcohol, which is rather expensive and furthermore apparently not of great value in a normal detergent formulation.

The other method mentioned above has the drawback that the production on an industrial scale is difficult due to the rather complicated equipment comprising for example mixer-kneader-feeder-extruder-"Marumerizer"-dryer.

It is surprising that the most convenient methods for granulation of powders, that is the use of granulation in a pelletizing drum or on a pelletizing plate, using water as the granulating liquid, never seem to have been used or described for the granulation of enzyme powders. A comprehensive survey of the machinery offered in the granulation field is given in "Aufbereitungstechnik" No. 3, 1970, p. 147–153 and No. 5, 1970, p. 262–278.

The reason why the above mentioned granulation method have not found any industrial use is probably due to the fact that the granulation process is extremely difficult to control. Thus, during the production of enzyme granulates in a drum granulator a thick and not easily removable layer of the material which should be granulated usually tends to build up on the walls of the granulator. Also, a mixture of enzyme powder with a salt, such as sodium chloride, is difficult to granulate in this way, because the transition from a sufficiently wetted mixture to an overwetted mixture requires a very small amount of water. An overwetted mixture results in an excessively coarse granulate. Also, in a correctly wetted mixture the granules are growing so fast that control of the particle size is difficult.

We have now found that an enzyme granulate can be produced without serious build-up of an unwanted layer of starting material for the granulation on the walls of the drum granulator, that the powder mixture being granulated is less sensitive to granulating agent, e.g. water, and that the growth rate for the granules is slower, if certain process parameters are adhered to. By means of the present invention a large scale production of granulated enzymes can be performed more satisfactorily from a technical point of view than with the known methods.

More specifically, the process for the production of enzyme granulates according to the present invention comprises the introduction into the drum granulator of from 2 to 40% by weight of cellulose in fibrous form, from 0 to 10% by weight of a binder as herein defined, enzyme and filler in an amount which generates the intended enzyme activity in the finished granulate, a liquid phase granulating agent consisting of a waxy substance, as defined herein, and/or water, in an amount of between 5 and 70% by weight, whereby the maximum amount of waxy substance is 40% by weight and the maximum amount of water is 70% by weight, whereby all percentages are referring to the total amount of dry substances, the sequence of the introduction of the different materials being arbitrary, except that at least a major part of the granulating agent is introduced after at least a substantial part of the dry substances is introduced in the granulator, whereafter the granulate if necessary is dried in a conventional manner, perferably in a fluid bed.

It is believed that the cellulose fibres are responsible for the fact that the walls of the granulator are kept free of an unwanted layer of starting material. On the basis of the known characteristics of cellulose fibres it would be expected that incorporation of cellulose fibre powder without binding ability tends to create a granulate which is more abrasive and physically weaker than a corresponding granulate without fibrous cellulose powder; surprisingly, however, it has been found that the granules produced according to the invention have a higher physical stability and a higer resistance against abrasion than granules without cellulose fibres and consequently a very low dust level.

The cellulose in fibrous form can be sawdust, pure, fibrous cellulose, cotton, or other forms of pure or impure fibrous cellulose.

Several brands of cellulose in fibrous form are on the market, e.g. CEPO and ARBOCEL. In a publication from Svenska Tramjolsfabrikerna AB, "Cepo Cellulose Powder" it is stated that for Cepo S/20 cellulose the approximate miximum fibre length is 500 μ, the approximate average fibre length is 160 μ, the approximate maximum fibre width is 50 μ and the approximate average fibre width is 30 μ. Also it is stated that CEPO SS/200 cellulose has an approximate maximum fibre length of 150 μ, an approximate average fibre length of 50 μ, an approximate maximum fibre width of 45 μ and an approximate average fibre width of 25 μ. Cellulose fibres with these dimensions are very well suited for the purpose of the invention.

The binders used in the process according to the invention are the binders conventionally used in the field of granulation with a high melting point or with no melting point at all and of a non waxy nature, e.g. polyvinyl pyrrolidone, dextrins, polyvinylalcohol, and cellulose derivatives, including for example hydroxypropyl cellulose, methyl cellulose or CMC. A granulate can not be formed on the basis of cellulose, enzyme, filler and a binder, as above defined, without the use of a granulating agent, as defined below.

All enzymes can be granulated by means of the process according to the present invention. Preferably, amylases and proteinases are granulated according to the invention. Specific examples are ALCALASE (a Bacillus licheniformis proteinase), ESPERASE and SAVINASE (microbial alcaline proteinases produced according to the British Pat. No. 1,243,784) and THERMAMYL (a Bacillus licheniformis amylase). The enzyme can be introduced into the granulator as a predried milled powder or as a solution, for example a concentrated enzyme solution prepared by ultrafiltration, reverse osmosis or evaporation.

The filler is used only for the purpose of adjusting to the intended enzyme activity in the finished granulate. Since the enzyme introduced into the granulator already contains diluent impurities which are considered as fillers additional filler is not always needed to standardize the enzymatic activity of the granulate. If a filler is used, it is usually NaCl, but other indifferent fillers which do not interfere with the granulating process and later use of the product can be used, especially other inorganic salts.

The granulating agent is water and/or a waxy substance. The granulating agent is always used as a liquid phase in the granulation process; the waxy substance if present therefore is either dissolved or dispersed in the water or melted. By a waxy substance is understood a substance which possesses all of the following characteristics: (1) the melting point is between 30° and 100° C, perferably between 40° and 60° C, (2) the substance is of a tough and not brittle nature, and (3) the substance possesses substantial plasticity at room temperature.

Both water and waxy substance are granulating agents, i.e. they are both active during the formation of the granules; the waxy substance stays as a constituent in the finished granules, whereas the majority of the water is removed during the drying. Thus in order to refer all amounts to the finished, dry granules all percentages are calculated on the basis of total dry substances, which means that water, one of the granulating agents, is not added to the other constituents when calculating the percentage of water, whereas the waxy substance, the other granulating agent, has to be added to the other dry constituents when calculating the percentage of waxy substance. Examples of waxy substances are polyglycols, fatty alcohols, ethoxylated fatty alcohols, higher fatty acids, mono-, di- and triglycerolesters of higher fatty acids, e.g. glycerol monostearate, alkylarylethoxylates, and coconut monoethanolamide.

If a high amount of waxy substance is used, relatively little water should be added, and vice versa. Thus the granulating agent can be either water alone, waxy substance alone or a mixture of water and waxy substance. In case a mixture of water and waxy substance is used, the water and the waxy substance can be added in any sequence, e.g. first the water and then the waxy substance, or first the waxy substance and then the water or a solution or suspension of the waxy substance in the water. Also, in case a mixture of water and waxy substance is used, the waxy substance can be soluble or insoluble (but dispersable) in water.

If no water is used in the granulating agent, usually no drying is needed. In this case the granulating agent is a melted waxy material, and only cooling is needed to solidify the particles. In most cases, however, some drying is performed, and the drying is usually carried out as a fluid bed drying whereby small amounts of dust and small granules are blown away from the surface of the granules. However, any kind of drying can be used. In the instance where no water is used as a granulating agent, a flow conditioner or anticaking agent may be added to the granulate either before or after the cooling step, e.g. fumed silica, for instance the commercial products AEROSIL or CAB-O-SIL.

The granulator can be any of the known types of mixing granulators, drum granulators, pan granulators or modifications of these. If a mixing granulator is used, for example a mixing drum from the German Company Gebr. Lodige Maschinen G.m.b.H, 479 Paderborn, Elsenerstrasse 7–9, DT, it is preferred that small rotating knives are mounted in the granulator in order to compact the granules.

A preferred embodiment of the process according to the invention comprises the use of cellulose in fibrous form with an average fiber lengh of around 50–160 μ and an average fibre width of around 20–30 μ. Cellulose fibres with these dimensions give rise to granules with excellent physical stability.

A preferred embodiment of the process according to the invention comprises the use of between 5 and 30% by weight of cellulose. With this amount of cellulose no build-up of unwanted layers of starting material on the inside walls of the granulator can be detected whatsoever.

A preferred embodiment of the process according to the invention comprises the use of a proteolytic enzyme of microbial origin. By use of this embodiment a commercially useful product is obtained, i.e. a dust free detergent additive.

A preferred embodiment of the process according to the invention comprises the use of proteolytic enzyme which is derived from Bacillus licheniformis. By use of this embodiment a detergent additive is obtained which is relatively cheap and has a very low dust level.

A preferred embodiment of the process according to the invention comprises the use of a proteolytic enzyme derived from the genus Bacillus according to British Pat. No. 1,243,784. By use of this embodiment a detergent additive is obtained which has a very low dust level and which has a very high proteolytic activity at high pH values.

A preferred embodiment of the process according to the invention comprises the use of an amylase derived from Bacillus licheniformis.

By use of this embodiment an amylase preparation is obtained, which is very well suited for degradation of starch, is cheap and has a very low dust level.

A preferred embodiment of the process according to the invention comprises a process wherein water is the only granulating agent. By use of this embodiment a relatively cheap granulate with a satisfactory low dust level is produced.

A preferred embodiment of the process according to the invention comprises the use of water and waxy substance as the granulating agents. By use of this embodiment the following advantages are obtained. Due to the fact that water is used as a constituent of the granulating agent the product is relatively cheap. Due to the fact that a waxy substance constitutes a constituent of the granulating agent, the single granules will attain a plastic nature to the point that upon local compression they will not crush and thereby create dust, but will be transformed each into a small flat disc which practically does not give off any dust.

A preferred embodiment of the process according to the invention comprises a granulation carried out at 50–70° C. By use of this embodiment granules with a more homogeneous particle size distribution are produced. In chosing granulation temperature, due regard has to be taken of the heat stability of the enzyme being granulated, some enzymes having a better heat stability than others.

A preferred embodiment of the process according to the invention comprises subjecting the finished granules to coating with a melted wax, preferably polyethylene glycol (PEG), whereafter the thus coated particles optionally are powdered with a finely comminuted coloring agent, preferably $TiO_2$. This coating can be carried out in any conventional manner, e.g. as described in British Pat. No. 1,362,365, page 1, line 82 to page 2, line 34, and British Patent application No. 34973/73 and 10842/74 corresponding to Belgium Pat. No. 146,802.

Also, the invention comprises the enzyme granulate produced by means of the process according to the invention. Desirably the dry granules have a diameter between 0.3–1.5 mm.

In case the enzyme is used as an enzyme additive for detergents a whitening agent, for example $TiO_2$, can be incorporated in the granules. By adding the $TiO_2$ at different times during the granulating process, if the granulating is performed discontinuously, or at different positions in the granulator, if the granulating is performed continuously, the $TiO_2$ may be distributed inside the granules, or on the surface of the granules or both, as desired.

Preferably all the solid materials are added first to the granulator, whereafter a homogeneous mixture is created and then the granulating agent is introduced as a spray (from one or more of the nozzles present on the granulator).

Usually the filling volume of the total solid starting materials is below 50% of the total volume of the granulator, preferably below 30% of the total volume of the granulator, which, of course, leaves space for the granulating agent.

Suprisingly it has been found that the size of the granules increases much less with time with the fibrous cellulose in the granules than without the fibrous cellulose in the granules. Thus, the granulation can be controlled much easier with the fibrous cellulose than without. The drawing, to which reference is now made illustrates granule growth rates in a granulator according to practice of this invention, as compared to prior art practices.

With the granulation according to practice of the invention it is possible to avoid excessive recirculation of granules which are too fine and to large; actually only about 20% of the granules are recirculated as an average.

Practice of the invention is illustrated in the following specific examples. All the examples have the following in common.

1. The composition of a given composition as a dry powder.
2. Mixing of the dry powder composition.
3. Wetting of the powder mixture with granulating agent e.g. water or a water/binder solution.
4. Processing of the wet powder mixture with the granulating apparatus (rotating knife) until the granulate has the desired particle distribution and degree of roundness.

In all the experiments described in the examples a cylindrical Lodige type mixer FM 130 D I Z (U.S. Pat. No. 3,027,102) has been used. The mixer is equipped with both plough shaped mixers mounted on a horizontal (axial) rotating shaft and a granulating device, consisting of one or more cross knives mounted on a shaft introduced into the mixer through the cylindrical wall in a direction perpendicular to the above mentioned horizontal rotating shaft (i.e. radial of the cylinder).

5. Fluid bed drying of the moist granulate until a dryness which satisfies both the requirements of enzyme stability and the requirements of free-flowing properties and mechanical strength. Usually this will correspond to a water content less than 10%, preferably less than 3%.

In the instances where the granulating agent is exclusively or principally a waxy substance only cooling may be required.

6. Optionally coating.

EXAMPLE I

25% ALCALASE, 10% cellulose fibres, 1% binder: PVP K 30

1. Powder components; 7.5 kg ground proteolytic enzyme ALCALASE (7.5 AU/g) 0.6 kg titanium dioxide 3.0 kg cellulose powder-CEPO S 20 (The Swedish cellulose powder and Wood Flour Mills Ltd.) 18.6 kg ground sodium chloride.

2. The above components are mixed on the Lodige mixer FM 130 D I Z with a rotating speed of the mixer of 160 rpm and with a revolution speed of a single cross knife granulating device of 3000 rpm for 1 minute.

3. Thereafter wetting is performed with 6.6 kg of a 4.5% aqueous solution of polyvinylpyrrolidone (PVP K 30) during continuous mixing with both mixing-aggregate and granulating device.

A pneumatic atomizing nozzle is used, which is adjusted to a 10 minute spraying time.

4. After spraying of the binder solution (according to 3), the moist mixture is further exposed to the compacting action of the granulating device for 8 minutes.

The rotating speed on the mixing aggregate is kept on 160 rpm and on the granulating device on 3000 rpm.

After the treatment a uniform glubular to a lens-formed granulate is obtained.

The mixer shows no build-up of an unwanted layer at the end of the process.

5. The moist granulate is dried on a fluidized bed until a moisture content below 3% is obtained.

6. The particle size distribution for the dried granulate is:

| | | |
|---|---|---|
| 6.5% | > 1.4 mm | |
| 11.5% | > 1.2 mm | |
| 27% | > 840μm | |
| 39% | > 707μm | $d_m$ = 600μm |
| 49% | > 595μm | |
| 60% | > 500μm | ($d_m$ is a symbol designating the |
| 75% | > 420μm | average diameter by weight and an abbreviation |
| 5.9% | < 300μm | of diameter mean) |

EXAMPLE II (comparative example without fibrous cellulose powder

25% Alcalase, 1% binder: PVP K 30).

1. Powder components: 7.5 kg ground ALCALASE (7.5 Au/g) 0.6 kg titanium dioxide 21.6 kg ground sodium chloride 2–3. The above composition is mixed and wetted with 3.5 kg of a 8.6% solution of PVP K 30, corresponding to 1% in the final composition, as described in Example 1.

The moist mixture is further exposed to the action of the granulating device for 5 minutes under conditions as described in Example 1.

At the end of the processing a build-up of a hard layer on the wall and tools of the mixer was observed.

5. The moist granulate was dried as described in Example 1.

6. The particle size distribution of the dried granulate is:

| | | |
|---|---|---|
| 6.0% | > 1.4 mm | |
| 21% | > 840 μm | |
| 30% | > 707 μm | $d_m$ = 580 μm |
| 67% | > 500 μm | |
| 85% | > 420 μm | |
| 3.0% | < 300 μm | |

The consequence of incorporating cellulose fibres in connection with the mechanical stability of the granulate was tested by comparing the degradation and formation of fines/dust when the granulate from Example 1 and 2 were treated in a ball mill.

PROCEDURE FOR BREAK-DOWN OF THE GRANULATE 60 g sieved granulate with a particle distribution of 300–840 μm is rotated in a ball mill, which is a closed steel cylinder (diameter 11.5 cm, height 10 cm) with a speed of 100 rpm. The cylinder contains eight steel balls with a diameter of 1.9 cm.

Samples from Example 1 and 2 were treated in this way for 5,10,20 and 40 minutes.

After this treatment the mechanical resistance of the granulate is tested according to two procedures.

Procedure 1

The 60 g of the material, whch has been exposed to the ball mill treatment, is transferred quantitatively to an elutriation tube, length 2 meter, diameter 35 mm. In the bottom of this tube a sintered glass plate is mounted, on which the sample is placed, whereafter fluidizing with air at a speed of 0.8 m/sec is performed for 40 minutes.

The dust which is blown off and which has a particle size less than about 150 μm, dependent on the roundness of each single particle, is collected quantitatively on a glassfibre filter, whereafter the dust is weighted and analysed for enzymatic activity.

Procedure 2

The material which has been exposed to the ball mill treatment is transferred quantitatively to a set of sieves, in the actual case 600 μm, 420 μm, 300 μm and 150 μseives were chosen whereafter the changes in the particle distribution, caused by the mechanical treatment, are determined.

The granulate according to Examples 1 and 2, compared by procedure 1.

| Duration of treatment in ball mill | Experiment 1 (with cellulose fibres) | Experiment 2 (without cellulose fibres) |
|---|---|---|
| 0 minutes (untreated) | total dust 14.1 mg active dust 3077 μg at 1.5 AU/g | 16.8 mg 4145 μg at 1.5 AU/g |
| 5 minutes | total dust 47.4 mg active dust 26.060 μg at 1.5 AU/g | 696 mg 662.000 μg at 1.5 AU/g |
| 20 minutes | total dust 1.4 g active dust 1.290.000 μg at 1.5 AU/g | 5.9 g 6.100.000 μg at 1.5 AU/g |

It appears from the above comparison that the granulate with cellulose fibres releases less dust, both with respect to the total amount and with respect to enzymatic activity, than the preparation without cellulose and leads to a conclusion that cellulose stabilizes the granulate structure.

The granulate according to Examples 1 and 2, compared by procedure 2.

| | Example 1 With Cellulose Fibres | | | | |
|---|---|---|---|---|---|
| Ball Mill Time, min | 0 | 5 | 10 | 20 | 40 |
| % < 840 μm | 100 | 100 | 100 | 100 | 100 |
| % < 600 μm | 66.0 | 65.8 | 69.5 | 72.4 | 72.3 |
| % < 420 μm | 25.5 | 28.4 | 32.6 | 36.4 | 40.1 |
| % < 300 μm | ~0 | 2.6 | 5.0 | 8.6 | 17.8 |
| % < 150 μm | ~0 | 0.03 | 0.15 | 2.3 | 11.0 |

| | Example 2 Without Cellulose Fibres | | | | |
|---|---|---|---|---|---|
| Ball Mill Time, min | 0 | 5 | 10 | 20 | 40 |
| % < 840 μm | 100 | 100 | 100 | 100 | 100 |
| % < 600 μm | 64.0 | 70.4 | 88.9 | 96.3 | 99.85 |
| % < 420 μm | 15.8 | 34.7 | 57.4 | 72.3 | 93.1 |
| % < 300 μm | ~0 | 8.6 | 23.9 | 39.7 | 64.6 |
| % < 150 μm | ~0 | 0.47 | 2.4 | 6.8 | 17.2 |

It appears from the tables that the granulate without cellulose fibres is broken down more quickly and releases more dust (<150 μm) during ball mill treatment.

EXAMPLE III (Composite as Example 1, with change of apparatus parameters)

A granulate is prepared as in Example 1, with the difference, that the mixing device is adjusted to 120 rpm during the granulation and instead of a pneumatic nozzle a pressure nozzle is used.

A four cross knives granulating tool was employed. Particle size distribution for the dried granulate was as follows:

| | | |
|---|---|---|
| 1.5% | > 1.4 mm | |
| 8.3% | > 1.0 mm | |
| 16% | > 840 μm | |
| 37% | > 710 μm | $d_m$ = 600 μm |
| 49% | > 600 μm | |
| 71% | > 500 μm | |
| 84% | > 420 μm | |
| 6% | < 300 μm | |

EXAMPLE IV (25% ALCALASE, 10% cellulose fibres 10% binder; yellow dextrine)

| 1. Power Components: | | |
|---|---|---|
| 7.5 | kg | ground ALCALASE - 7.5 AU/g |
| 15.9 | kg | ground sodium chloride |
| 3.0 | kg | yellow dextrine |
| 0.6 | kg | titanium dioxide |
| 3.0 | kg | fibrous cellulose powder (CEPO S 40) |

2. The above composition is mixed as described in Example 1, employing in this instance 3.0 kg of water sprayed on the mixture.
3. The mixture is granulated for 4 minutes, as described in Example 1.
4. The granulate is dried as described in Example 1.
5. Particle size distribution for the dried granulate:

| | | |
|---|---|---|
| 10% | > 1.2 mm | |
| 24% | > 840 μm | |
| 34% | > 707 μm | $d_m$ = 550 μm |
| 44% | > 595 μm | |
| 79% | > 420 μm | |
| 12% | < 300 μm | |

EXAMPLE V (25% ALCALASE, 15% cellulose fibres, 2% binder: hydroxypropylcellulose).

1. A composition consisting of 4 kg ground ALCALASE - 7.5 AU/g 12.2 kg ground sodium chloride 0.4 kg titanium dioxide 3.0 kg fibrous cellulose CEPO S 40 (15%)
2. is mixed according to example 1, whereafter
3. 6.4 kg of a 7% solution of hydroxypropylcellulose KLUCEL E is sprayed on the mixture according to example 1. (The word KLUCEL is a Trademark).
4. The moist mixture is granulated for 9 minutes, and otherwise example 1 is followed.
5. The granulate is dried according to Example 1.
6. Particle size distribution for the dried granulate:

| | | |
|---|---|---|
| 16.0% | > 840 μm | |
| 29% | > 707 μm | |
| 62% | > 500 μm | $d_m$ = 570 μm |
| 78% | > 420 μm | |
| 5.3% | < 300 μm | |

EXAMPLE VI

A composition according to Example 1 is prepared and wetted with 7.0 kg of a 4.3% solution of PVP K 30.

The wetted mixture is further granulated for 6 minutes. During the granulation samples are taken after 2,3 and 4 minutes. Drying is performed according to example 1.

The particle size distribution for the dried granulate after the granulation treatment in 2,3,4 and 6 minutes, respectively, is as follows:

| | 2 min | 3 min | 4 min | 6 min |
|---|---|---|---|---|
| > 1.2 mm | 5.5 | 6.0 | 9.2 | 10.2 |
| > 840 μm | 18 | 20 | 25 | 30 |
| > 707 μm | 29 | 31 | 38 | 45 |
| > 500 μm | 61 | 66 | 78 | 80 |
| > 420 μm | 81 | 86 | 89 | 93 |
| > 300 μm | 2.2 | 1.4 | 1.5 | 0.9 |
| $d_m$ | 550 μm | 580 μm | 625 μm | 670 μm |
| $d_m(t)/d_m(4)$ | 0.88 | 0.92 | 1 | 1.07 |

$d_m(t)$ is the average diameter after $t$ minutes of granulation. $d_m(t)/d_m(4)$ is a growth parameter chosen to illustrate growth versus time.

EXAMPLE VII (Composition as Example 1). Examples 6 and 7 show the growth of the particle as a function of the duration of the granulation.

A composition according to Example 1 is prepared and wetted with 6.0 kg of a 5% solution of PVP K 30 action.

The wetted mixture is further granulated or 12 minutes; during the granulation samples are taken after 4,6 and 8 mins.

The particle size distribution for the dried granulate after the granulation treatment in 4,6,8 and 12 minutes, respectively, is as follows:

| | 4 min | 6 min | 8 min | 12 min |
|---|---|---|---|---|
| > 1.2 mm | 3.9 | 4.1 | 3.9 | 5.0 |
| > 840 μm | 12 | 14 | 15 | 17 |
| > 707 μm | 19 | 22 | 23 | 27 |
| > 500 μm | 39 | 46 | 53 | 56 |
| > 420 μm | 53 | 63 | 64 | 77 |
| < 300 μm | 17 | 8.9 | 10.0 | 6.7 |
| $d_m$ | 435 | 475 | 485 | 515 |
| $d_m(t)/d_m(4)$ | 1 | 1.09 | 1.12 | 1.18 |

EXAMPLE VIII (Comparative example without fibrous cellulose powder). Example 8 and 9 are comparative examples to Examples 6 and 7.

A composition is prepared and wetted as described in example 2 with 3.9 kg of a 7.7% PVP K 30 solution.

The wetted mixture is further granulated in 2,4 and 6 minutes respectively, and is dried according to example 1.

The particle size distribution of the dried granulate after the granulating treatment of 2,4, and 6 minutes, respectively, is as follows:

| | 2 min | 4 min | 6 min |
|---|---|---|---|
| >1.4 mm | 3.8 | 11 | 11 |
| >1.0 mm | 10 | 25 | 39 |
| >840 μm | 16 | 41 | 64 |
| >707 μm | 24 | 58 | 82 |
| >500 μm | 51 | 88 | 96 |
| >420 μm | 74 | 96 | 98 |
| >300 μm | 5.2 | 1.4 | 1.1 |
| $d_m$ | 510 | 770 | 920 μm |
| $d_m(t)/d_m(4)$ | 0.66 | 1 | 1.19 |

EXAMPLE IX (Comparatively example without fibrous cellulose powder).

A composition is prepared and wetted as described in Example 2 with 3.5 kg of a 8.6% aquous PVP solution.

The wetted mixture is further granulated for 4,8 and 12 minutes, respectively, and is dried according to Example 1.

The particle size distribution for the dried granulate after the granulating treatment in 4, 8 and 12 minutes, respectively, is as follows:

| | 4 min | 8 min | 12 min |
|---|---|---|---|
| > 1.4 mm | 7.3 | 15 | 19 |
| > 1.0 mm | 16 | 34 | 53 |
| > 840 μm | 22 | 48 | 75 |
| > 707 μm | 28 | 61 | |
| > 500 μm | 46 | 87 | |
| > 420 μm | 64 | 95 | |
| < 300 μm | 8.2 | 1.9 | |
| $d_m$ | 480 μm | 820 μm | 1030 μm |
| $d_m(t)/d_m(4)$ | 1 | 1.7 | 2.1 |

The particle growth with respect to granulating time with and without cellulose fibres, respectively, is shown on the drawing.

The ordinate is $d_m(t)/d_m(4)$, and the abscissa is $t/4$ min.

It appears that an enzyme granulate including cellulose fibres exhibits a smaller sensitivity towards processing and fluctuations in time, wetting and composition than a pure salt-enzyme granulate.

The granulate with fibrous cellulose is quite suitable for commercial purposes production and, furthermore, the self preserving properties of the particle size distribution of the granula based on fibrous cellulose is reponsible for the fact that the production equipment remains free from hard deposits.

EXAMPLE X (25% ALCALASE, 5% cellulose fibres, 1% binder: PVP K 30)

1. Powder components of the following composition: 7.5 kg ground ALCALASE - 7.5 AU/g 20.3 kg ground sodium chloride 1.5 kg fibrous cellulose CEPO SS 200 (5%) 0.6 kg titanium dioxide 2–3. is mixed and sprayed with 5.7 kg of a 5% water-PVP (K 30) solution.

4–5. The wetted mixture is granulated and dried according to Example 1.

6. The particle size distribution for the dried granulate is as follows:

| | | |
|---|---|---|
| 5% | >1.4 mm | |
| 16% | >1.0 mm | |
| 28% | >841 μm | |
| 45% | >707 μm | $d_m$ = 680 μm |
| 80% | >500 μm | |
| 93% | >420 μm | |
| 2.6% | <300 μm | |

EXAMPLE XI (15% ALCALASE, 16% THERMAMYL, 10% fibrous cellulose 1% binder: PVP K 30)

1. Powder componets in the following composition: 4.5 kg ground ALCALASE - 7.5 AU/g 4.8 kg ground THERMAMYL - 510 KNU/g 16.8 kg ground sodium chloride 0.6 kg titanium dioxide 3.0 kg fibrous cellulose (CEPO S 20)

2–3. is mixed and sprayed with 7.0 kg of a 4.5% PVP (K 30) solution.

4. The wetted mixture is granulated for 8 minutes.

5. The granulate is dried as described in Example 1.

6. The particle size distribution for the dried granulate is as follows:

| | | |
|---|---|---|
| 5% | >1.4 mm | |
| 25% | >841 μm | |
| 40% | >600 μm | $d_m$ = 560 μm |
| 60% | >500 μm | |
| 3% | <300 μm | |

60 g of the dried granulate, sieved between 300 and 841 μm, is elutriated as described in procedure 1 on page 12.

The attrition, determined by the method, is totally 4.5 mg and the activity 900 mg at 1.5 AU/g

EXAMPLE XII (15% THERMAMYL, 10% cellulose fibres, 2% binder: PVP K 30)

1. A composition consisting of 4.5 kg ground THERMAMYL - 510 KNU/g 0.6 kg titanium dioxide 3.0 kg fibrous cellulose CEPO S 20 18.6 kg ground sodium chloride 2–3. is mixed and wetted with 7.4 kg a 9% aqueous PVP (K 30) solution. The wetted mixture is granulated for 10 minutes and dried as described in Example 1.

The particle size distribution of the dried granulate is as follows:

| | | |
|---|---|---|
| 13% | >1.4 mm | |
| 20% | >1.2 mm | |
| 30% | >1.0 mm | $d_m$ = 840 μm |
| 50% | >841 μm | |
| 64% | >707 μm | |
| 1.8% | <420 μm | |

EXAMPLE XIII (18% ESPERASE, 10% cellulose fibres, 1% binder: PVP K 30)

b 1. A mixture consisting of: 5.4 kg ground ESPERASE - 27 KNPU/g 0.6 kg titanium dioxide 3.0 kg CEPO S 20 20.7 kg ground sodium chloride 2,3,4,5. is wetted with 6.4 kg of a 4.7% aqueous solution of PVP (K 30). The wetted mixture is granulated and dried as described in Example 1.

6. The particle size distribution for the dried granulate is as follows:

| | | |
|---|---|---|
| 6.2% | > 1.4 mm | |
| 14.% | > 1.0 μmm | |
| 24 % | > 840 μm | |
| 36 % | > 707 μm | $d_m$ = 590 μm |
| 47 % | > 600 μm | |
| 62 % | > 500 μm | |
| 76 % | > 420 μm | |
| 6.8% | < 300 μm | |

EXAMPLE XIV (87% ALCALASE, 10% cellulose fibres, 1% binder: PVP K 30)

1. A mixture consisting of: 17.4 kg ground ALCALASE - 7.5 AU/g 0.4 kg titanium dioxide 2.0 kg fibrous cellulose (CEPO S 20)

2–3. is mixed and wetted with 4.4 kg of a 6.8% solution of PVP K 30.

4–5. The wetted mixture is granulated and dried according to Example 3.

6. The particle size distribution for the dried granulate is as follows:

| | | |
|---|---|---|
| 30% | > 1.4 mm | |
| 54% | > 840 μm | |
| 76% | > 595 μm | $d_m$ = 900 μm |
| 91% | > 420 μm | |
| 0.6% | < 300 μm | |

EXAMPLE XV (25% ALCALASE, 30% cellulose fibres, 1% binder: PVP K 30)

1. Powder components: 5 kg ground ALCALASE - 7.5 AU/g 8.4 kg ground sodium chloride 0.4 kg titanium dioxide 6.0 kg fibrous cellulose (CEPO S 20)

2. The above components are mixed on the Lodige mixer FM 130 D I Z rotating speed of the mixer of 100 rpm and with a rotating speed of 3000 rpm of the granulating device.

3. Then, the mixture is wetted with 10.1 kg of 2% (PVP K 30) aqueous solution (corresponding to a water content of 49.5% based on dry matter).

A pressure nozzle adjusted to 17 minutes total spraying time was used.

4–5. The wetted mixture was granulated for 3 minutes (multiple knife device) and dried according to Example 1.

The particle size distribution of the dried granulate is as follows:

| | | |
|---|---|---|
| 1.5% | >1.4 mm | |
| 3.4% | >1.0 mm | |
| 7.0% | >840 μm | |
| 24% | >595 μm | $d_m$ ~475 μm |
| 42% | >500 μm | |
| 62% | >420 μm | |
| 9.4% | <300 μm | |

EXAMPLE XVI (5% ALCALASE, 10% cellulose fibres, 10% binder: yellow dextrin).

1. A composition consisting of: 1.5 kg ground ALCALASE - 7.5 AU/g 21.9 kg ground sodium chloride 0.6 kg titanium dioxide 3.0 kg yellow dextrin 3.0 kg fibrous cellulose (CEPO S 20)

2–3. is mixed and sprayed with 4.0 kg water.

4–5. The mixture was granulated and dried according to Example 3.

6. The particle size distribution for the dried granulate is as follows:

| | | |
|---|---|---|
| 2% | > 1.4 mm | |
| 14% | >1 mm | |
| 27% | > 840 μm | |
| 42% | >707 μm | $d_m$ = 640 μm |
| 52% | > 595 μm | |
| 65% | > 500 μm | |
| 81% | >420 μm | |
| 7.6% | <300 μm | |

EXAMPLE XVII (18% ALCALASE, supplied from a solution, 25% fibrous cellulose)

1. A composition consisting of: 11.4 kg ground sodium chloride 0.4 kg titanium dioxide 5.0 kg fibrous cellulose (CEPO S 20)

2. is mixed as described in Example 3

3. The mixture is sprayed with 10.5 kg of a 35% aqueous solution of ALCALASE concentrate (4.2 AU/g), concentrated by reverse osmosis.

4. The wetted mixture is granulated 4 minutes with machine variables as described in Example 3.

5. Whereafter the granulate is dried as described in Example 1.

6. The particle size distribution for the dried granulated is as follows:

| | | |
|---|---|---|
| 10% | > 1.4 mm | |
| 25% | > 1.0 mm | |
| 39% | > 841 μm | |
| 53% | > 707 μm | $d_m$ ~740 μm |
| 64% | > 595 μm | |
| 79% | > 500 μm | |
| 87% | > 420 μm | |
| 4% | < 300 μm | |

EXAMPLE XVIII (25% Alcalase, 10% cellulose fibres, 20% fatty alcohol ethoxylate)

1. Powder composition: 7.5 Kg ALCALASE ® concentrate (7.4 Anson units/g), ground 0.6 kg titanium dioxide 3.0 kg fibrous cellulose (CEPO S 40) 12.9 kg ground sodium chloride 2. The above components are mixed and heated to 55° C using a steam/water jacketed Lodige Mixer FM 130 D I Z.

3. At this stage the mixture is kept at 55° C using water at about this temperature in the jacket and sprayed with 6 kg of an ethoxylated fatty alcohol (BEROL ® 067) with a melting point of about 46° C using a pressure nozzle, the temperature of the hot melt being kept at 60° C. The spraying time is adjusted to 6 min. during which the mixer is operated at a rotating speed of 160 rpm and the granulating device (single cross knife) at 3000 rpm.

4. After spraying the mixture is further exposed to the compacting action of the granulating device for 6 min.

5. The granulate is transferred to a fluidized bed and cooled to room temperature (approx. 25° C) whereby a relatively free flowing granulate is formed.

6. Particle size distribution for the cooled granulate is as follows:

| | | |
|---|---|---|
| 11% | > 840 μm | |
| 35% | > 600 μm | |
| 70% | > 420 μm | $d_m$ = 525 μm |
| 6% | < 300 μm | |

EXAMPLE XIX (approx. 23% Alcalase, 9.3 cellulose fibres, 25.5% CMEA)

1. Powder composition: 7.5 kg ground ALCALASE ® (7.4 Anson units/g) 0.6 kg titanium dioxide 3.0 kg fibrous cellulose (ARBOCEL ® BSM 300) 12.9 kg sodium chloride 2. The above components are mixed and heated to 70° C using a jacketed Lodige mixer as described in Example 18.

3. The mixtures is kept at 70° C and sprayed with 8.2 kg melted (80° C) coconut monoethanolamide CMEA (Marchon EMPILAN CME melting point 67° C, solidification point 63° C) using a pressure nozzle.

4. The spraying and compacting is otherwise carried out as described in Example 18.

5. The granulate is cooled in a mixer with gentle agitation whereby it solidifies to a somewhat sticky granulate, with the stickiness ascribed to the CMEA.

6. Particle size for the cooled granulate is as follows:

| | | |
|---|---|---|
| > 1.7 mm | 9.0% | |
| > 1.4 — | 17% | |
| > 1.2 — | 24% | |
| > 1.0 — | 41% | $d_m$ = 940 μm |
| > 840 μm | 65% | |
| > 600 — | 93% | |
| < 420 — | 0.5% | |

EXAMPLE XX (25% Alcalase, 10% cellulose fibers, 18% CMEA)

1. Powder composition: 7.5 kg ground Alcalase® concentrate (7.4 Anson units/g) 0.6 kg titanium dioxide 3.0 kg fibrous cellulose (ARBOCEL® BSM 300) 13.5 kg ground sodium chloride 2. The above components are mixed and heated to 70° C.

3. The mixture is sprayed with 5.4 kg melted CMEA as described in Example 19, the spraying time being adjusted to 4 minutes. Thereafter the spraying is continued with 2.6 kg water, the spraying time being adjusted to 2 minutes. The mixing device is operated at 95 rpm during the spraying and the granulating device at 3000 rpm.

4. After spraying the mixture is further compacted for 6 minutes with the mixing device at 175 rpm and the granulating device at 3000 rpm.

5. The granulate is dried as described in Example 1, whereafter it is cooled to 30° C. Now the granulate appears as a free flowing granulate.

6. The particle size distribution is as follows:

| | | |
|---|---|---|
| 0.2% | > 1.7 mm | |
| 2.2% | > 1.4 mm | |
| 15% | > 1.0 mm | |
| 35% | > 841 μm | $d_m$ = 730 μm |
| 72% | > 600 μm | |
| 92% | > 420 μm | |
| 3.9% | < 3.9 μm | |

EXAMPLE XXI (25% Alcalase, 20% cellulose fibers, 20% PEG 1500)

1. Powder composition: 5 kg ALCALASE® (7.4 Anson units/g), ground 0.4 kg titanium dioxide 4.0 kg fibrous cellulose CEPO S 20 6.6 kg ground sodium choride 2. The above components are mixed and heated to 55° C as described in Example 18.

3. The mixture is sprayed with a solution consisting of 4 kg polyethylene glycol 1500 and 2.5 kg of water, the solution being kept at 55° C and the spraying time being adjusted to 7 minutes. The mixing device is operated at 95 rpm during the spraying and the granulating device at 3000 rpm.

4. After spraying the mixture is further compacted for 8 minutes with the mixing device at 175 rpm and the granulating device at 3000 rpm.

5. The granulate is dried as described in Example 1 whereafter it is cooled to 30° C. Now the granulate appears as a free flowing granulate.

6. The granulate has the following particle size distribution:

| | | |
|---|---|---|
| 2.1% | > 1.2 mm | |
| 8.4% | > 1.0 — | |
| 20% | > 841 μ | |
| 52% | > 600 μ | $d_m$ = 610 μ |
| 29% | > 420 μ | |
| 6.6% | < 300 μ | |

EXAMPLE XXII 1,2,3,4,5: as in Example 1.

5a 7 kg granulate as prepared in Example 1 and after a sieving procedure where particles greater than 840 μ and smaller than 300 μm have been removed, is heated to 55° C in a jacketed Lodige mixer M 20.

The hot granulate is sprayed with 7% polyethylene glycol 1500 (60° C) with continuous mixing. After distribution of PEG 1500 the granulate is powdered with 8.5% titanium dioxide with continous mixing, $TiO_2$ being used as a whitening agent.

After distribution of $TiO_2$ a further 2% PEG 1500 is supplied in order to stick all the powder to the surface of the granulate.

All percentages are based on the weight of the dry uncoated granulate.

Half of the hot coated granulate is cooled in the mixer using gentle agitation and cooling water in the jacket.

The other half of the hot coated granulate is transferred to a cooler with rotating cooling coils.

After cooling the granulate is further sieved between 300 and 840 μm.

EXAMPLE XXIII 1,2,3,4,5: As in Example 1.

5a. 7 kg granulate as prepared in Example 1 is heated to 70° C in a jacketed Lodige M 20.

The hot granulate is sprayed with 13% PEG 6000 (in which 0.2% of a blue dye polar brilliant blue RAWL, Ciba Geigy is dispersed) during continuous mixing. All percentages are based on the weight of the dry, uncoated granulate.

After homogeneous distribution of the color the granulate is cooled and sieved as described in Example 22.

EXAMPLE XXIV

Example 23 was repeated except that the dye was powdered directly on the base granulate, whereafter the coating with PEG was performed.

What is claimed:

1. In the process for drum granulating an enzyme composition including enzyme, inorganic salts, and a granulation binder, with a liquid phase granulating agent, the improvement which comprises incorporating into the composition undergoing granulation finely divided cellulose fibers in an amount of 2–40% w/w based upon the dry weight of the total composition.

2. The process of claim 1 wherein the cellulose has an average fiber length of 50–160 μ and an average fiber width of 20–30 μ.

3. The process of claim 1 wherein the fibrous cellulose is 5–30% w/w.

4. The process of claim 1 wherein the granulating agent is water.

5. The process of claim 1 wherein the granulating agent is a mixture of water and a waxy substance.

6. The process of claim 1 wherein granulation is performed at 50°–70° C.

7. The process of claim 1 wherein the enzyme is a proteolytic enzyme of microbial origin.

8. The process of claim 1 wherein the enzyme is an amylase of microbial origin.

9. The process of claim 1 wherein granulation is followed by coating the particles of the granulate with a melted waxy substance.

10. A granulate composition comprising enzyme, inorganic salts, a granulation binder, and finely divided cellulose fibers as 2–40% w/w of the granulate.

11. The granulate of claim 10 including therein a waxy substance in amounts up to 40% w/w of the granulate.

* * * * *